(12) United States Patent
Ascorra et al.

(10) Patent No.: US 10,957,500 B2
(45) Date of Patent: Mar. 23, 2021

(54) KEYBOARD BACKLIGHTING WITH REDUCED DRIVER CIRCUITRY

(71) Applicant: Apple Inc., Cupertino, CA (US)

(72) Inventors: Alejandro Lara Ascorra, Gilbert, AZ (US); Qian Zhang, San Jose, CA (US); Thai Q. La, San Jose, CA (US)

(73) Assignee: Apple Inc., Cupertino, CA (US)

( * ) Notice: Subject to any disclaimer, the term of this patent is extended or adjusted under 35 U.S.C. 154(b) by 744 days.

(21) Appl. No.: 15/211,818

(22) Filed: Jul. 15, 2016

(65) Prior Publication Data
US 2018/0019081 A1 Jan. 18, 2018

(51) Int. Cl.
*H01H 13/83* (2006.01)
*G06F 3/02* (2006.01)
*G06F 1/16* (2006.01)

(52) U.S. Cl.
CPC ........... *H01H 13/83* (2013.01); *G06F 1/1616* (2013.01); *G06F 1/1662* (2013.01); *G06F 3/0202* (2013.01); *H01H 2219/039* (2013.01)

(58) Field of Classification Search
CPC ......... G09G 3/342; G09G 3/3426; G09G 3/32
See application file for complete search history.

(56) References Cited

U.S. PATENT DOCUMENTS

| | | |
|---|---|---|
| 5,880,582 A | 3/1999 | Sawada |
| 5,982,201 A | 11/1999 | Brokaw et al. |
| 6,278,326 B1 | 8/2001 | Murray et al. |
| 6,621,235 B2 | 9/2003 | Chang |
| 8,378,972 B2 | 2/2013 | Pance et al. |
| 2009/0189846 A1* | 7/2009 | Nishikawa ........... G09G 3/3406 345/102 |
| 2010/0302162 A1* | 12/2010 | Jo ......................... G06F 3/0202 345/168 |
| 2010/0302169 A1* | 12/2010 | Pance .................. G06F 3/0237 345/170 |
| 2012/0001613 A1 | 1/2012 | Larsen et al. |
| 2012/0151416 A1* | 6/2012 | Bell .................... G02B 27/2228 715/848 |
| 2012/0206369 A1* | 8/2012 | Chou .................... G06F 3/0202 345/170 |
| 2012/0256924 A1* | 10/2012 | Uema ................ H04N 21/4122 345/428 |
| 2014/0139717 A1* | 5/2014 | Short .................... H04N 7/142 348/333.1 |
| 2015/0091779 A1* | 4/2015 | Li ......................... G06F 3/1423 345/1.3 |
| 2015/0334799 A1 | 11/2015 | Ascorra et al. |
| 2017/0315623 A1* | 11/2017 | Yao ......................... G06F 3/021 |

OTHER PUBLICATIONS

"Application Guide; Current Distribution in Parallel LED Strings." OSRAM Opto Semiconductors, Jun. 2011, 7 pages.

* cited by examiner

*Primary Examiner* — Duane N Taylor, Jr.
(74) *Attorney, Agent, or Firm* — Kubota & Basol LLP

(57) ABSTRACT

Systems and methods for selective keyboard backlighting with reduced driver circuitry are provided. In one example embodiment, a method includes, inter alia, simultaneously controlling, with a control signal, an output of a first light emitting element that illuminates only one key of a plurality of keys of a keyboard and an output of a second light emitting element that illuminates only one key of the plurality of keys, and maintaining, with a current mirror circuit, uniformity between the output of the first light emitting element and the output of the second light emitting element.

20 Claims, 5 Drawing Sheets

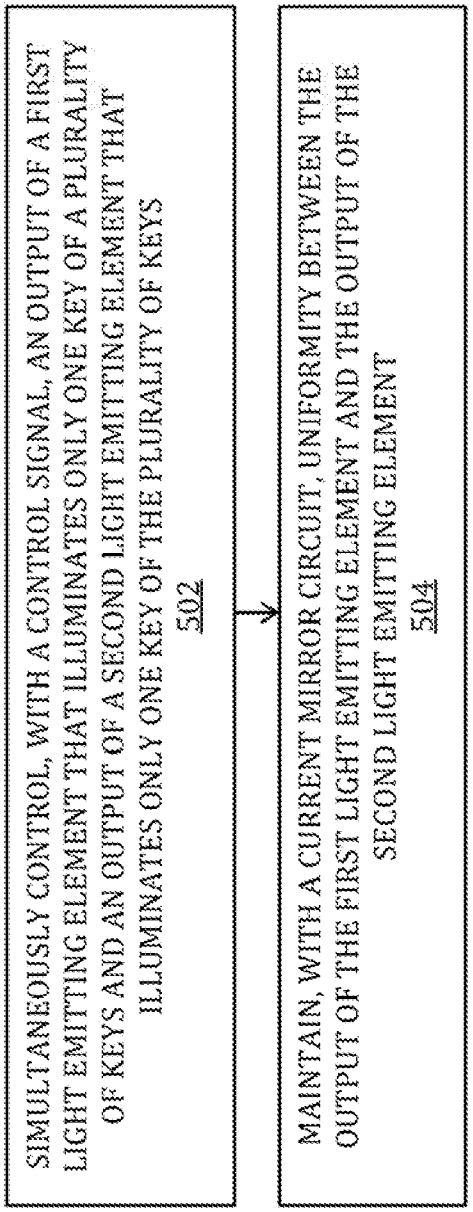

KEYBOARD BACKLIGHTING WITH REDUCED DRIVER CIRCUITRY

TECHNICAL FIELD OF THE DISCLOSURE

This disclosure relates to keyboard backlighting and, more particularly, to selective keyboard backlighting with reduced driver circuitry.

BACKGROUND OF THE DISCLOSURE

Despite computers becoming more useful for a variety of personal, business, and manufacturing tasks, computing keyboards have hardly changed beyond their original design. Physically, some keyboards have improved by providing a single backlight that allows the user to see the keys of a keyboard better. However, such backlights are typically static and therefore do not provide any additional utility beyond improving the visibility of keys.

SUMMARY OF THE DISCLOSURE

This document describes systems and methods for selective keyboard backlighting with reduced driver circuitry.

As an example, a keyboard assembly may include a plurality of keys, a plurality of light emitting elements including at least a first light emitting element and a second light emitting element, a light driver that drives a control signal on a driver channel, and a control sharing circuit that enables the control signal from the driver channel to simultaneously control an output of the first light emitting element and an output of the second light emitting element, wherein the first light emitting element is positioned with respect to the plurality of keys such that the output of the first light emitting element illuminates only one key of the plurality of keys, and wherein the second light emitting element is positioned with respect to the plurality of keys such that the output of the second light emitting element illuminates only one key of the plurality of keys.

As another example, a keyboard assembly may include a plurality of keys, a first light emitting element, a second light emitting element, a light driver that drives a control signal on a driver channel, and a current mirror circuit, wherein the second light emitting element is coupled to the driver channel and the first light emitting element via the current mirror circuit, and wherein the control signal from the driver channel simultaneously controls an output of the first light emitting element that illuminates only one key of the plurality of keys and an output of the second light emitting element that illuminates only one key of the plurality of keys.

As yet another example, a method for illuminating a keyboard of a keyboard assembly that includes a plurality of keys, a first light emitting element, a second light emitting element, a light driver that drives a control signal on a driver channel, and a current mirror circuit, where the method includes simultaneously controlling, with the control signal, an output of the first light emitting element that illuminates only one key of the plurality of keys and an output of the second light emitting element that illuminates only one key of the plurality of keys, and maintaining, with the current mirror circuit, uniformity between the output of the first light emitting element and the output of the second light emitting element.

This Summary is provided only to summarize some example embodiments, so as to provide a basic understanding of some aspects of the subject matter described in this document. Accordingly, it will be appreciated that the features described in this Summary are only examples and should not be construed to narrow the scope or spirit of the subject matter described herein in any way. Unless otherwise stated, features described in the context of one example may be combined or used with features described in the context of one or more other examples. Other features, aspects, and advantages of the subject matter described herein will become apparent from the following Detailed Description, Figures, and Claims.

BRIEF DESCRIPTION OF THE DRAWINGS

The discussion below makes reference to the following drawings, in which like reference characters may refer to like parts throughout, and in which:

FIG. 5 illustrates a method for illuminating a keyboard according to some embodiments described herein.

DETAILED DESCRIPTION OF THE DISCLOSURE

Figure 1:
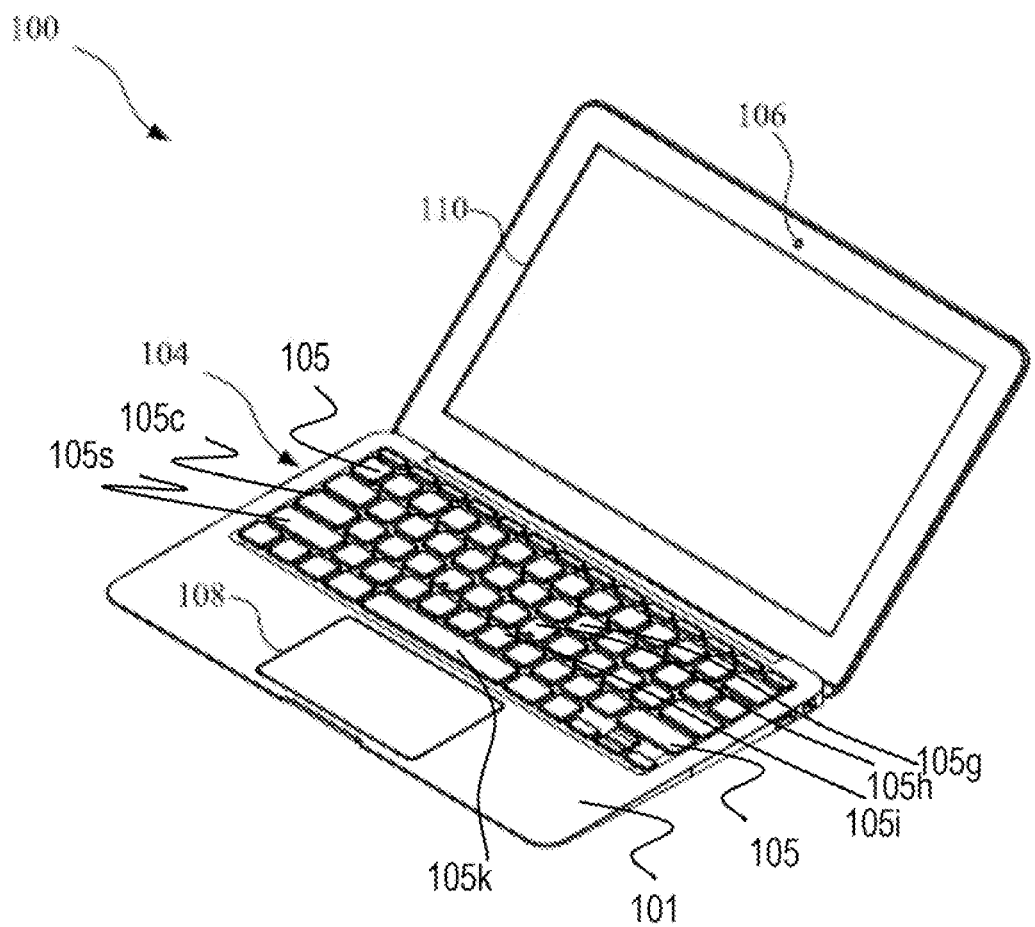
FIG. 1 illustrates a perspective view of a computing device according to some embodiments described herein.
Figure 2:
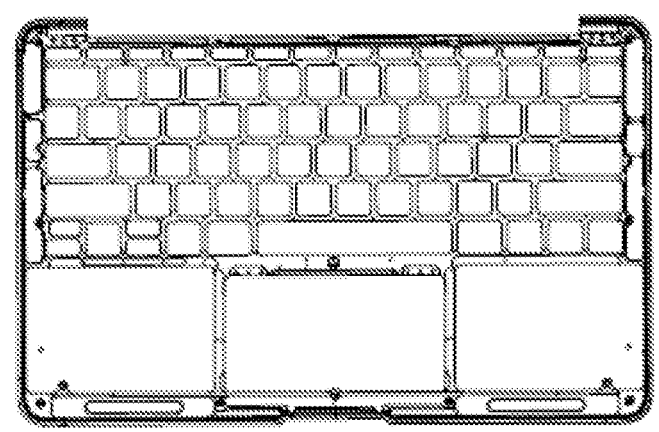
FIG. 2 illustrates a bottom view of an interior of a keyboard of the computing device of FIG. 1 according to some embodiments described herein.

Representative applications of systems and methods according to the present disclosure are described in this section. These examples are being provided solely to add context and aid in the understanding of the described embodiments. It will thus be apparent to one skilled in the art that the described embodiments may be practiced without some or all of these specific details. In other instances, well known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting; such that other embodiments may be used, and changes may be made without departing from the spirit and scope of the described embodiments.

This document describes various embodiments that relate to multiple keyboard backlights. In particular, some embodiments set forth herein include a lighting circuit for a keyboard. The lighting circuit can include one or more light emitting diode (LED) drivers. Additionally, the lighting circuit can include a host controller coupled to each of the one or more LED drivers, and a memory coupled to the host controller, which can store configuration data for the one or more LED drivers. Furthermore, the lighting circuit can include a plurality of LEDs coupled to the one or more LED drivers, wherein each LED or a subset of LEDs of the plurality of LEDs may be assigned to illuminate a particular key of the keyboard and two or more LEDs may be jointly controlled by a single LED driver channel to be jointly responsive to an operation performed by a computing device associated with the keyboard. A control sharing circuit (e.g., a current mirror) may couple two or more jointly controlled LEDs and may be operative to maintain uniformity between the illumination output of each LED.

In some embodiments, a method may be set forth for controlling brightness of light emitting diodes (LEDs) coupled to a keyboard. The method can include a command being sent to a lighting circuit for a keyboard, wherein the lighting circuit may control the brightness of a plurality of LEDs. The method can further include the brightness of one or more LEDs or of one or more subsets of LEDs of the plurality of LEDs to be changed.

The user experience for various computing devices has been drastically changing over time. Many advances in technology have led to computer interfaces that are more intuitive for a user, thereby allowing the user to more effectively use the computing device. For example, computer keyboards have become easier for the user to accomplish various tasks such as word processing and web browsing. In particular, lighting schemes for computing devices have provided a user with more visibility when typing. However, many lighting schemes lack dynamics and variability even though the computing device may otherwise contain many powerful and dynamic software applications. The embodiments set forth herein provide a more dynamic lighting circuit for a keyboard of a computing device in order to cure the aforementioned deficiencies. The lighting circuit described herein may include several light emitting diode (LED) drivers, each having multiple channels for controlling multiple LEDs. The lighting circuit may also include an electrically erasable read-only memory (EEPROM) or other suitable memory component for storing configuration data for the LED drivers. Each LED or any subset of LEDs may be configured to illuminate a single key of a keyboard, allowing the lighting circuit to modify the brightness of each key without affecting the brightness of other keys. Not only may this provide more possibilities for lighting schemes for the keyboard, but this may also provide a thinner mechanical design for the keyboard as the LEDs can be located more proximate to the individual keys. Lighting schemes can include illuminating a group or groups of keys at a different brightness level than other keys not contained in the group. For example, if the user is playing a game or using a software application that uses one or more keys more frequently than other keys, the more frequently used keys can be illuminated while the other keys can remain dim or off. Additionally, by providing a lighting circuit with such capabilities, a uniform brightness for the entire keyboard can be established through an initial calibration process. The calibration process may ensure that the entire keyboard may be evenly illuminated to give a naturally uniform brightness across the keyboard. Two or more LEDs may be jointly controlled by a single control signal of a driver channel to reduce the number of driver channels required for a particular number of LEDs of the keyboard illumination assembly.

These and other embodiments are discussed below with reference to FIGS. 1-5, however, those skilled in the art will readily appreciate that the detailed description given herein with respect to these figures is for explanatory purposes only and should not be construed as limiting.

FIG. 1 illustrates a perspective view of a computing device 100. Specifically, FIG. 1 shows a computing device 100 that may include a keyboard 104 with one or more keys 105, a camera 106, a touchpad 108, and a display 110. One or more other components may be additionally or alternatively provided within computing device 100, such as within housing 101 of computing device 100, such as one or more processing components, one or more memory components, one or more sensor components, one or more communications components, one or more power supply components, and/or the like. A view of an interior 102 of keyboard 104 may be shown by FIG. 2. When operating computing device 100, it may be desirable to have a certain amount of illumination provided for a user of computing device 100. The illumination can be provided from display 110 in order to illuminate keyboard 104 and touchpad 108. The illumination can also be provided from camera 106, which can include an internal light source for creating better quality movies or taking pictures. The lighting can also be provided from a backlight located at interior 102 of keyboard 104. However, having a single backlight may not be adequate for a user of computing device 100. Additionally, the backlight may conflict with the lighting of display 110 and/or an internal light source of camera 106. Moreover, incorporating only a single backlight may limit the operability of keyboard 104 by not providing a user with a more dynamic set of keyboard lights. However, the embodiments set forth herein are intended to resolve these aforementioned issues by providing a more dynamic keyboard lighting scheme. By incorporating multiple lights that may be dynamically operated by computing device 100, a user may be provided with a keyboard interface that can adjust for various tasks and functions of computing device 100. In this way, the user may be able to be more efficient because the keyboard interface may offer an additional means for communicating information to the user.

Figure 3:
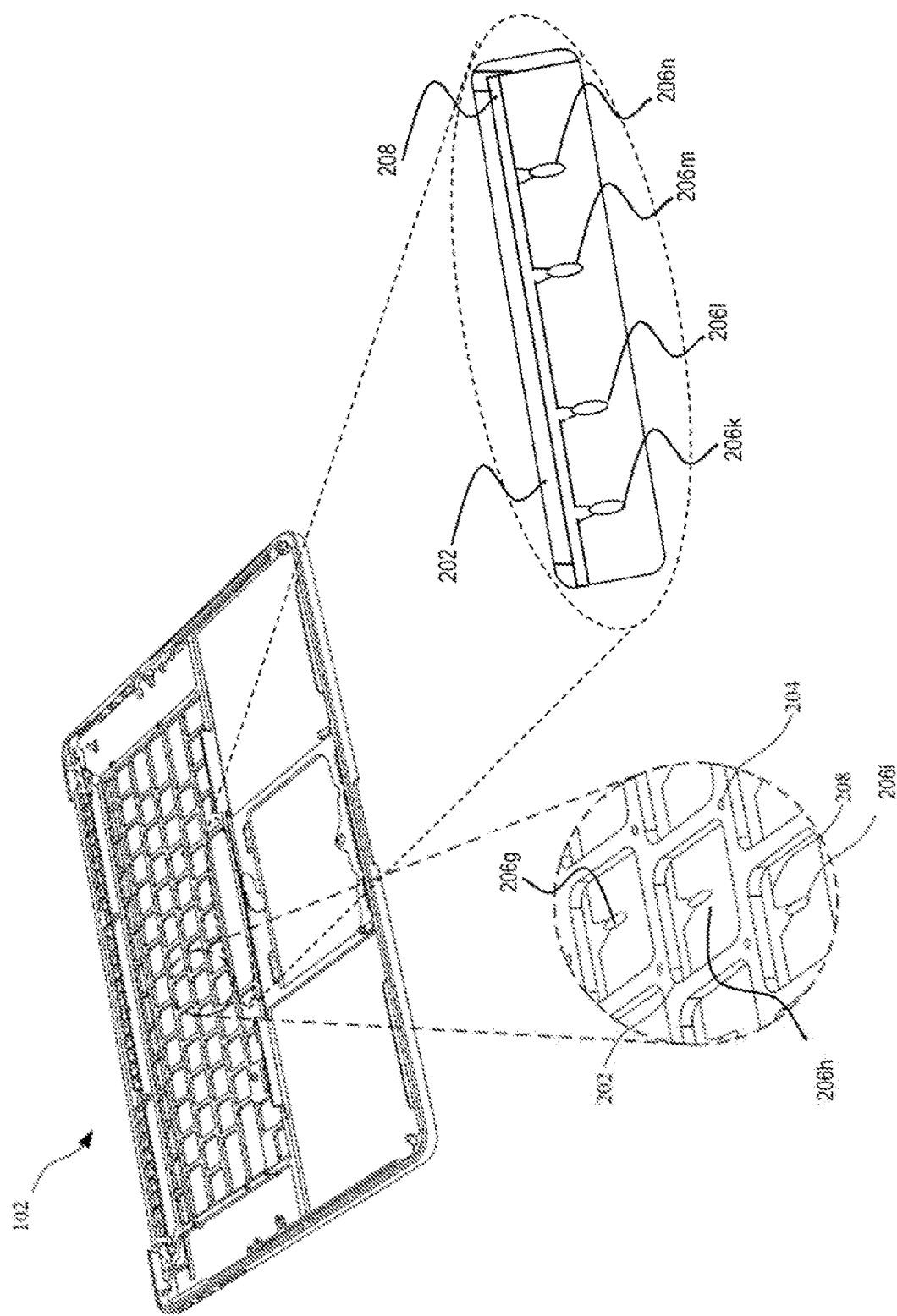
FIG. 3 illustrates a perspective view of the interior of the keyboard of FIG. 2 having one or more light emitting diodes (LEDs) positioned with respect to different keys of the keyboard according to some embodiments described herein.

FIG. 3 illustrates a perspective view of interior 102 of keyboard 104. Specifically, FIG. 3 sets forth an arrangement of light emitting diodes (LEDs) 206 or any other suitable light emitting components within interior 102 of keyboard 104. An LED (e.g., an LED 206) may be any suitable light-emitting element (LEE), such as any suitable light emitting diode, including, but not limited to, an inorganic light-emitting diode, an organic light-emitting diode, a high brightness light-emitting diode, a micro-light-emitting diode, a nano-light-emitting diode, and/or the like, or any other suitable component that may emit light for illuminating a keyboard. In some embodiments, LEDs 206 may be coupled to a wire or flexible cable or any other suitable data and/or power communication conductor 208 or multiple conductors 208 that may form one or more rows and/or columns across interior 102 of keyboard 104. Conductors 208 may extend from a circuit that drives LEDs 206. Conductors 208 can extend from a lateral portion of interior 102 and/or may reside above or below interior 102 of keyboard 104. In some embodiments, keyboard 104 can include six rows of conductors 208 for providing power and/or control signals to LEDs 206. In other embodiments, more or less than six rows can be used. In this way, LEDs 206 can branch off of a conductor 208 in a respective row of keys 105 and terminate within a cavity 202 of interior 102 (e.g., a cavity within which at least one particular key 105 may travel or be accessed by a user). The LEDs 206 can also be configured to terminate above or below the lateral edges of cavities 202, or within apertures 204 of interior 102. Moreover, one or more LEDs 206 can terminate within the portion of a key 105 that may typically be depressed or otherwise interfaced with by a user. For example, space bar key 105$k$ of keyboard 104 can include one or more LEDs 206 (e.g., LEDs 206$k$, 206*l*, 206*m*, and 206*n* for key 105$k$ of FIG. 1 (e.g., LEDs 206*k*-206*n* may be arranged substantially in a linear fashion (e.g., as a string of LEDs))) that may be within or under the volume of at least a portion of space bar key 105$k$ that may be depressed by a user. As shown, keyboard 104 may be provided with one LED 206 per each one of some keys 105 (e.g., LED 206*g* for key 105*g* of FIG. 1, LED 206*h* for key 105*h* of FIG. 1, and LED 206*i* for key 105*i* of FIG. 1) and multiple LEDs 206 per each one of other keys (e.g., space bar key 105*k* of FIG. 1). In some embodiments, LEDs 206 may branch off from keyboard 104 away from or toward display 110 or any other suitable component of computing device 100. In some embodiments, One or more conductors 208 may extend through interior 102 substantially perpendicular or parallel to display 110 or any other suitable component of computing device 100. One or more conductors 208 may be embedded into a housing of computing device 100 during one or more manufacturing processes. In this way, conductors that may provide power and/or control signals to one or more LEDs 206 may be at least partially or completely encapsulated by material that forms any suitable housing 101 of computing device 100.

Keys 105 can be configured within computing device 100 such that light from LEDs 206 can escape keyboard 104. For example, in some embodiments, keys 105 may be separated from a surface portion of keyboard 104 to reveal LEDs 206. Moreover, in some embodiments, a key 105 can include an aperture or cavity with an angled perimeter that may allow light from one or more LEDs 206 associated with that key 105 to escape from key 105. One or more keys 105 can also be translucent or transparent in some embodiments. Additionally, as discussed further herein, one or more keys 105 can include multiple LEDs 206. In this way, each key 105 can be assigned one or more LEDs 206 that can illuminate the key or a portion of the key during operation of computing device 100. Any LED 206 of FIG. 3 can be any variety of types of LED. For example, in some embodiments, each cavity 202 or aperture 204 can be assigned one or more single color LEDs 206, such as a red, green, blue, white LED, or the like. In other embodiments, one or more LEDs 206 may be a bi-color or a tri-color LED. Moreover, the number of LEDs 206 per key or cavity 202 or aperture 204 can be at least one or more LEDs 206, and each key 105 or cavity 202 can be assigned a variety of types of LEDs 206. For example, a cavity 202 can be configured to include a single color LED, a bi-color LED, and/or a tri-color LED, or any suitable combination thereof.

Figure 4:
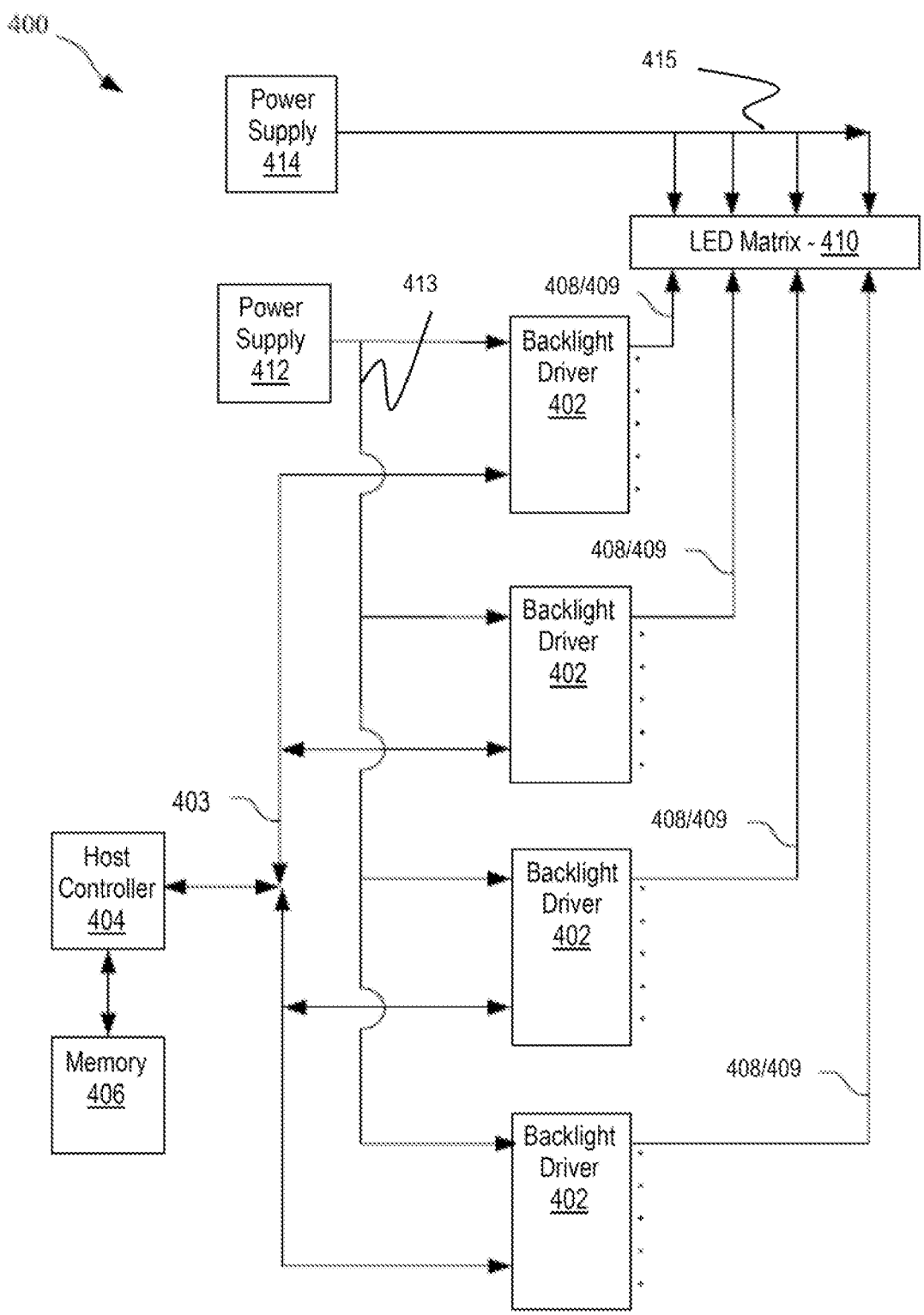
FIG. 4 illustrates a diagram of a circuit for controlling the keyboard LEDs according to some embodiments described herein.

FIG. 4 illustrates a diagram of a circuit 400 of an assembly (e.g., a keyboard assembly with keyboard 104) that may be operative for controlling the keyboard backlights of keyboard 104. Specifically, FIG. 4 shows how LEDs 206 of keyboard 104 may be powered and controlled by a circuit 400 of computing device 100. LEDs 206 may be represented as an LED matrix 410 in FIG. 4. LED matrix 410 may represent every LED 206 that may be associated with keys 105 at keyboard 104, and may include all the conductive pathways that may transmit power and/or control signals to LEDs 206 (e.g., conductors 208). LED matrix 410 may receive supply power from supply power connections 415 from a power supply 414 from computing device 100 in a variety of voltages, including, but not limited to, one or more of 5 volts or 3.3 volts, for example, at approximately 15 milliamps per LED 206. Moreover, in some embodiments, the voltage can be greater than or less than 3.3 volts, and the current can be greater than or less than 15 milliamps per LED 206. The supply power from power supply 414 can be a single line boost supply that may allow for the beaming up and down of one, some, or all LEDs 206 of LED matrix 410 at one time. Control signals 408 may be received by LED matrix 410 from one or more backlight driver integrated circuits (ICs) or backlight LED drivers 402 (e.g., four backlight drivers 402 as shown in FIG. 4). Each backlight driver 402 can be powered by a supply power connection 413 from a power supply 412 and may include any suitable number of channels (e.g., 8 channels, 10 channels, 16 channels, 24 channels, 32 channels, 64 channels, etc.), each of which may output a respective control signal 408 on a respective driver channel line 409 to LED matrix 410. Each control signal 408 on a respective driver channel line 409 may be operative to control at least one LED 206 of LED matrix 410. Therefore, by incorporating multiple backlight drivers 402, the number of LEDs 206 in LED matrix 410 can be increased to allow a one to one matching between total number of LED driver channels of drivers 402 and the total number of LEDs 206. For example, in FIG. 4, 4 backlight drivers 402 may be provided, each of which may include 24 driver channel lines 409, such that 96 total driver channels may be coupled to LED matrix 410 for any suitable number of LEDs 206, such as 96 LEDs 206 (e.g., one LED 206 per driver channel). Where multiple LEDs 206 may be assigned to a single key 105 of keyboard 104 (e.g., as shown in FIG. 3), backlight drivers 402 can be provided to accommodate the total number of LEDs 206 assigned to all keys 105. For example, in some embodiments, if each key 105 of keyboard 104 may include a red LED, a green LED, and a blue LED associated therewith, such that, if keyboard 104 included 100 such keys for including 300 LEDs, and if each driver 402 may provide 16 driver channel lines 409, circuit 400 may include 19 such drivers 402 to enable each one of the 300 LEDs 206 to be associated with its own unique driver channel line 409. Circuit 400 can incorporate a high density ball grid array (BGA) to allow for ease of manufacturing and assembly of circuit 400, especially with respect to LED matrix 410, which can include over 100 control signals 408 and supply power connections 415 from power supply 414. In this way, the BGA can provide a more organized interface for permanently soldering or otherwise connecting the various components of circuit 400.

Circuit 400 can further include a host controller 404 and a memory component 406 (e.g., an electrically erasable read-only memory (EEPROM)). Memory 406 can be configured to store default settings, device configuration, calibration settings, and/or any other suitable data for initiating and running circuit 400. For example, memory 406 can include firmware for configuring circuit 400. The firmware can be loaded into host controller 404 and may configure backlight drivers 402 during a startup procedure of computing device 100. Additionally or alternatively, memory 406 can be read-only or rewritable. In the embodiments where memory 406 may be rewritable, memory 406 may be upgraded or otherwise modified by a user or a manufacturer. For example, computing device 100 can receive updates from the internet or elsewhere that may include firmware updates, which can be loaded into memory 406 by host controller 404. Host controller 404 may be any suitable hardware device (e.g., on a main logic board of computing device 100) that may be operative to interact with a software driver stored in a memory of computing device 100 (e.g., memory 406). In this way, host controller 404 may be operative to use a connection 403 (e.g., any suitable digital connection or otherwise) between host controller 404 and backlight drivers 402 to control LED matrix 410 in any suitable manner.

Figure 4A:
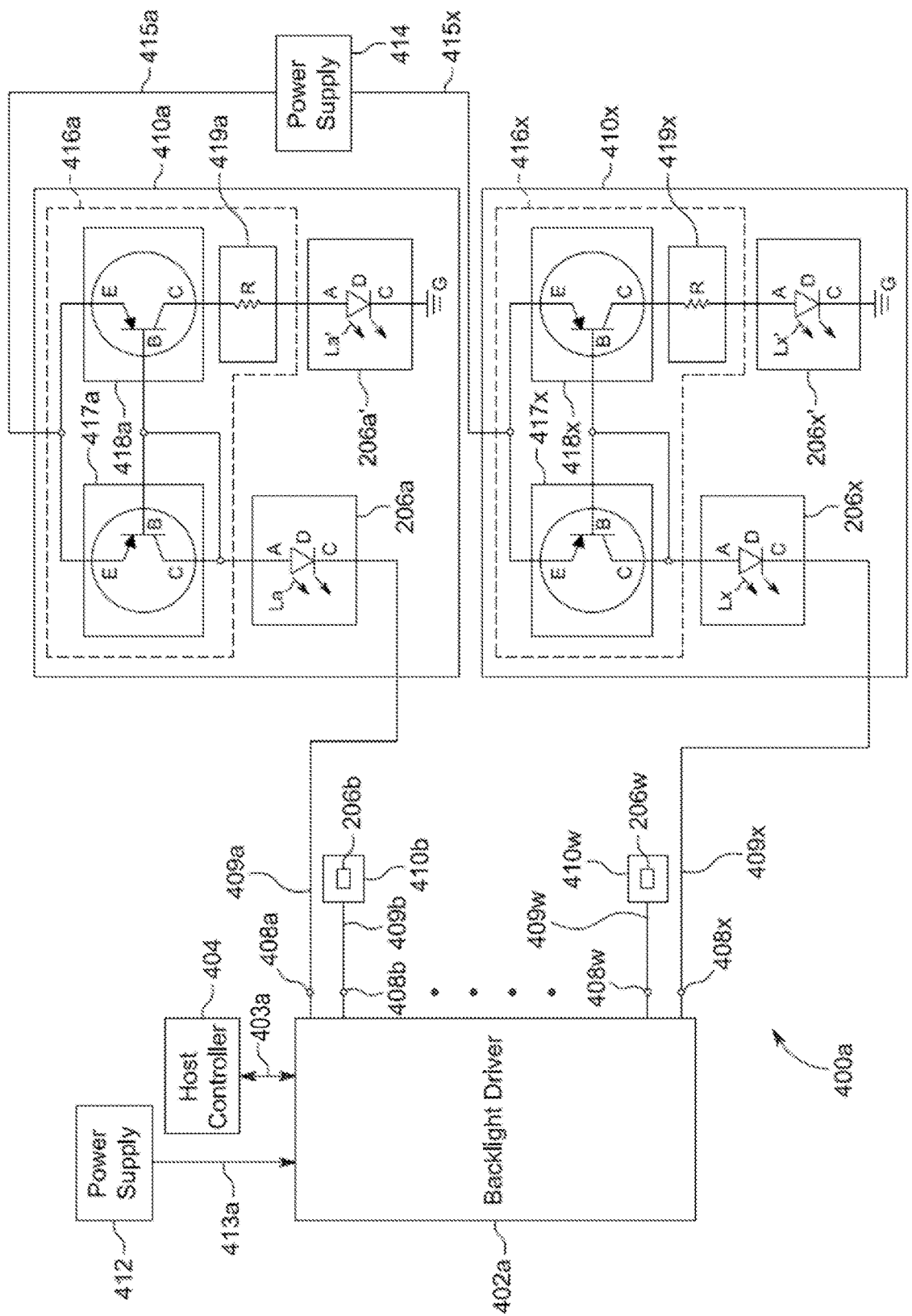
FIG. 4A illustrates a more detailed diagram of a portion of the circuit of FIG. 4 for controlling the keyboard LEDs according to some embodiments described herein.

A control signal 408 on a particular driver channel line 409 of a particular driver channel of a particular driver 402 may be operative to control a single particular LED 206 of LED matrix 410, while another control signal 408 on another particular driver channel line 409 of a particular driver channel of a particular driver 402 may be operative to control two or more particular LEDs 206 of matrix 410, such that the number of LEDs 206 that may be controlled by a driver 402 may be greater than the number of driver channels provided by that driver 402. For example, as shown in FIG. 4A, a particular embodiment of a particular circuitry 400a of circuitry 400 may include a first backlight driver 402a that may include 24 driver channels, each of which may provide a respective one of 24 control signals 408a-408x via a respective one of 24 driver channel lines 409a-409x to a respective one of 24 light emitting circuits 410a-410x of LED matrix 410, where each one of control signals 408a-408x may be independently controlled by driver 402a (e.g., based on data received by driver 402a from host controller 404 via connection 403a). Each one of light emitting circuits 410a-410x may include at least one LED (e.g., a respective one of LEDs 206a-206x) that may be controlled by a respective one of control signals 408a-408x. For example, light emitting circuit 410b may include only a single LED 206b that may be individually controlled by control signal 408b of driver channel line 409b, while light emitting circuit 410w may include only a single LED 206w that may be individually controlled by control signal 408w of driver channel line 409w. However, in some embodiments, one or more of light emitting circuits 410a-410x may include two or more LEDs that may be controlled by a single control signal. For example, as shown in FIG. 4A, light emitting circuit 410a may include a first LED 206a and a second LED 206a', each of which may be controlled by control signal 408a of driver channel line 409a of driver 402a, while light emitting circuit 410x may include a first LED 206x and a second LED 206x', each of which may be controlled by control signal 408x of driver channel line 409x of driver 402a. This may enable more LEDs to be controlled by driver 402a than the number of driver channels provided by driver 402a, which may enable unique circuitry layouts that may more efficiently use limited real estate of computing device 100.

Any suitable control sharing circuitry 416a may be provided by light emitting circuit 410a to enable a single control signal 408a of driver channel line 409a of driver 402a to control each one of the multiple LEDs of light emitting circuit 410a (e.g., each one of at least LEDs 206a and 206a'). In some embodiments, control sharing circuitry 416a may be operative to enable each one of LEDs 206a and 206a' to maintain a similar or identical brightness for a particular control signal 408a from driver channel line 409a of driver 402a and a particular supply power from supply power connection 415a of power supply 414 (e.g., a particular supply voltage ($V_{supply}$) of power connection 415a). For example, control signal 408a may be varied to vary the brightness of light emitted from each LED of light emitting circuit 410a. In some particular embodiments, as shown in FIG. 4A, control sharing circuitry 416a may be provided as any suitable current mirror or current-to-current converter that may be operative to maintain a similar amount of current through each one of LEDs 206a and 206a'. For example, as shown in FIG. 4A, control sharing circuitry 416a may include a first switch component or transistor 417a and a second switch component or transistor 418a (e.g., of a matched transistor pair). First transistor 417a may be a first PNP bi-polar junction transistor (BJT) with a collector C coupled to LED 206a (e.g., to an anode A of a diode D of LED 206a), an emitter E coupled to the supply power from supply power connection 415a of power supply 414 (e.g., $V_{supply}$ of power connection 415a), and a base B coupled to collector C of first transistor 417a (e.g., through application of negative feedback). Second transistor 418a may be a second PNP BJT with a collector C coupled to a node of any suitable resistance element 419a of control sharing circuitry 416a, an emitter E coupled to the supply power from supply power connection 415a of power supply 414 (e.g., $V_{supply}$ of power connection 415a), and a base B coupled to base B and collector C of first transistor 417a. Moreover, as shown, another node of resistance element 419a (e.g., a resistor R) may be coupled to LED 206a' (e.g., to an anode A of a diode D of LED 206a'). A cathode C of LED 206a may be coupled to driver channel line 409a while cathode C of LED 206a' may be coupled to ground G. As shown, LED 206a may include any suitable light emitting component (e.g., an optoelectronic emitter or an optoelectronic transmitter, such as a light emitting diode (LED) with a diode D with anode A and cathode C, or the like) that may be operative to emit light La, while LED 206a' may include any suitable light emitting component (e.g., an optoelectronic emitter or an optoelectronic transmitter, such as a light emitting diode (LED) with a diode D with anode A and cathode C, or the like) that may be operative to emit light La'.

A resistive value of resistance element 419a (e.g., the electrical resistance of resistor R of resistance element 419a) may be selected so as to enable control sharing circuitry 416a to minimize the mismatch between the amount of current flowing through each one of LEDs 206a and 206a' (e.g., to minimize the difference in brightness between light La and light La' at any given moment). Such a resistive value may be selected such that control sharing circuitry 416a may enable the creation of a voltage drop ($V_{drop}$) across resistance element 419a with a value similar to and/or equal to the value of the headroom voltage ($V_{headroom}$) that may be acceptable to or otherwise needed by driver channel line 409a of driver 402a. The $V_{headroom}$ may be the minimum voltage necessary to be present in each one of channels 409a-409x of driver 402a to achieve accurate current regulation. For example, a minimal acceptable $V_{headroom}$ for achieving accurate current regulation by driver channel 409a of driver 402a may be about or equal to 0.8 volts, such that when the LED peak current for each one of the LEDs of light emitting circuit 410a (e.g., each one of at least LEDs 206a and 206a') is set to 5 mA, the resistive value of the resistance element 419a may be set to be about or equal to 150 ohms so that the generated $V_{drop}$ may be as close as possible to the desired or required $V_{headroom}$ of 0.8 volts (e.g., 0.75 volts). The $V_{drop}$ that may be generated by resistance element 419a may be operative to help keep the collector-emitter voltage ($V_{CE}$) of transistor 418a as close as possible to the $V_{CE}$ of transistor 417a, which may be a key factor for achieving accurate current mirroring control by control sharing circuitry 416a, while each transistor may also have a base-emitter voltage ($V_{BE}$) and each LED may have a forward voltage ($V_F$). The $V_{CE}$ of transistor 417a and the $V_{CE}$ of transistor 418a may not be the same, but may be defined by the following equations:

$$V_{CE\text{-}417a} = V_{supply\text{-}415a} - V_{BE\text{-}417a} - V_{F\text{-}206a} - V_{headroom\text{-}409a}, \qquad (1)$$

where $V_{CE\text{-}417a}$ may be the collector-emitter voltage of transistor 417a, where $V_{supply\text{-}415a}$ may be the supply voltage of power connection 415a of power supply 414, where $V_{BE\text{-}417a}$ may be the base-emitter voltage of transistor 417a (e.g., 0.7 volts), where $V_{F\text{-}206a}$ may be the forward voltage of LED 206a, and where $V_{headroom\text{-}409a}$ may be the headroom voltage needed by driver channel line 409a of driver 402a; and $$V_{CE\text{-}418a} = V_{supply\text{-}415a} - V_{BE\text{-}418a} - V_{F\text{-}206a'} - V_{drop\text{-}419a}, \quad (2)$$

where $V_{CE\text{-}418a}$ may be the collector-emitter voltage of transistor 418a, where $V_{supply\text{-}415a}$ may be the supply voltage of power connection 415a of power supply 414, where $V_{BE\text{-}418a}$ may be the base-emitter voltage of transistor 418a (e.g., 0.7 volts), where $V_{F\text{-}206a'}$ may be the forward voltage of LED 206a', and where $V_{drop\text{-}419a}$ may be the voltage drop across resistance element 419a (e.g., the product of the resistive value of resistance element 419a and the value of the current through resistance element 419a). Based on equations (1) and (2), the $V_{CE}$ of each one of transistors 417a and 418a may be changed by the variation of the forward voltage of the LEDs of light emitting circuit 410a (e.g., by $V_{F\text{-}206a}$ and $V_{F\text{-}206a'}$), but resistance element 419a, as may be coupled in series with collector C of transistor 418a, may help to mimic the $V_{headroom\text{-}409a}$ factor that may be seen by transistor 417a, which may ultimately reduce the difference between $V_{CE\text{-}417a}$ and $V_{CE\text{-}418a}$. The resistive value of resistance element 419a may be set in such a way that it may generate a $V_{drop\text{-}419a}$ between 0.7 volts and 0.9 volts. For example, the resistive value of resistance element 419a may be between 140 ohms and 180 ohms (e.g., 150 ohms) for an LED current setting of 5 mA for the LEDs of light emitting circuit 410a (e.g., LED 206a and LED 206a'). In some embodiments, LED 206a may be referred to as a master LED of light emitting circuit 410a (e.g., as LED 206a may be coupled to driver channel 409a of circuit 410a and/or to the collector of a master transistor 417a that may act as a reference that may control the output of the current mirror) while LED 206a' and any other additional LEDs of light emitting circuit 410a may each be referred to as a slave LED of light emitting circuit 410a (e.g., each LED other than master LED 206a may be coupled to the master LED of circuit 410a via control sharing circuitry 416a (e.g., via a respective slave transistor), where two or more slave mirrored LEDs may be provided by light emitting circuit 410a). Therefore, a slave LED may be coupled to an associated driver channel and an associated master LED via an associated control sharing circuit (e.g., slave LED 206a' may be coupled to driver channel 409a and master LED 206a via control sharing circuitry 416a).

Similarly, any suitable control sharing circuitry 416x may be provided by light emitting circuit 410x to enable a single control signal 408x of driver channel line 409x of driver 402a to control each one of the multiple LEDs of light emitting circuit 410x (e.g., each one of LEDs 206x and 206x'). In some embodiments, control sharing circuitry 416x may be operative to enable each one of LEDs 206x and 206x' to maintain a similar or identical brightness for a particular control signal 408x and a particular supply power from supply power connection 415x from power supply 414 (e.g., supply voltage ($V_{supply}$) of power connection 415x). For example, control signal 408x may be varied to vary the brightness of light emitted from each LED of light emitting circuit 410x. In some particular embodiments, as shown in FIG. 4A, control sharing circuitry 416x may be provided as any suitable current mirror or current-to-current converter that may be operative to maintain a similar amount of current through each one of LEDs 206x and 206x'. For example, as shown in FIG. 4A, control sharing circuitry 416x may include a first switch component or transistor 417x and a second switch component or transistor 418x (e.g., of a matched transistor pair). First transistor 417x may be a first PNP BJT with a collector C coupled to LED 206x (e.g., to an anode A of a diode D of LED 206x), an emitter E coupled to the supply power from supply power connection 415x from power supply 414 (e.g., $V_{supply}$ of power connection 415x), and a base B coupled to collector C of first transistor 417x (e.g., through application of negative feedback). Second transistor 418x may be a second PNP BJT with a collector C coupled to a node of any suitable resistance element 419x of control sharing circuitry 416x, an emitter E coupled to the supply power from supply power connection 415x from power supply 414 (e.g., $V_{supply}$ of power connection 415x), and a base B coupled to base B and collector C of first transistor 417x. Moreover, as shown, another node of resistance element 419x (e.g., a resistor R) may be coupled to LED 206x' (e.g., to an anode A of a diode D of LED 206x'). A cathode C of LED 206x may be coupled to driver channel line 409x while cathode C of LED 206x' may be coupled to ground G. As shown, LED 206x may include any suitable light emitting component (e.g., an optoelectronic emitter or an optoelectronic transmitter, such as a light emitting diode (LED) with a diode D with anode A and cathode C, or the like) that may be operative to emit light Lx, while LED 206x' may include any suitable light emitting component (e.g., an optoelectronic emitter or an optoelectronic transmitter, such as a light emitting diode (LED) with a diode D with anode A and cathode C, or the like) that may be operative to emit light Lx'.

A resistive value of resistance element 419x (e.g., the electrical resistance of resistor R of resistance element 419x) may be selected so as to enable control sharing circuitry 416x to minimize the mismatch between the amount of current flowing through each one of LEDs 206x and 206x' (e.g., to minimize the difference in brightness between light Lx and light Lx' at any given moment). Such a resistive value may be selected such that control sharing circuitry 416x may enable the creation of a voltage drop ($V_{drop}$) across resistance element 419x with a value similar to and/or equal to the value of the headroom voltage ($V_{headroom}$) that may be acceptable to or otherwise needed by driver channel line 409x of driver 402a. The $V_{headroom}$ may be the minimum voltage necessary to be present in each one of channels 409a-409x of driver 402a to achieve accurate current regulation. For example, a minimal acceptable $V_{headroom}$ for achieving accurate current regulation by driver channel 409x of driver 402a may be about or equal to 0.8 volts, such that when the LED peak current for each one of the LEDs of light emitting circuit 410x (e.g., each one of at least LEDs 206x and 206x') is set to 5 mA, the resistive value of the resistance element 419x may be set to be about or equal to 150 ohms so that the generated $V_{drop}$ may be as close as possible to the desired or required $V_{headroom}$ of 0.8 volts (e.g., 0.75 volts). The $V_{drop}$ that may be generated by resistance element 419x may be operative to help keep the collector-emitter voltage ($V_{CE}$) of transistor 418x as close as possible to the $V_{CE}$ of transistor 417x, which may be a key factor for achieving accurate current mirroring control by control sharing circuitry 416x, while each transistor may also have a base-emitter voltage ($V_{BE}$) and each LED may have a forward voltage ($V_F$). The $V_{CE}$ of transistor 417x and the $V_{CE}$ of transistor 418x may not be the same, but may be defined by the following equations:

$$V_{CE\text{-}417x} = V_{supply\text{-}415x} - V_{BE\text{-}417x} - V_{F\text{-}206x} - V_{headroom\text{-}409x}, \quad (3)$$

where $V_{CE\text{-}417x}$ may be the collector-emitter voltage of transistor 417x, where $V_{supply\text{-}415x}$ may be the supply voltage of power connection 415x of power supply 414, where $V_{BE\text{-}417x}$ may be the base-emitter voltage of transistor 417x (e.g., 0.7 volts), where $V_{F\text{-}206x}$ may be the forward voltage of LED 206x, and where $V_{headroom\text{-}409x}$ may be the headroom voltage needed by driver channel line 409x of driver 402a; and $$V_{CE\text{-}418x} = V_{supply\text{-}415x} - V_{BE\text{-}418x} - V_{F\text{-}206x'} - V_{drop\text{-}419x}, \quad (4)$$

where $V_{CE\text{-}418x}$ may be the collector-emitter voltage of transistor 418x, where $V_{supply\text{-}415x}$ may be the supply voltage of power connection 415x of power supply 414, where $V_{BE\text{-}418x}$ may be the base-emitter voltage of transistor 418x (e.g., 0.7 volts), where $V_{F\text{-}206x'}$ may be the forward voltage of LED 206x', and where $V_{drop\text{-}419x}$ may be the voltage drop across resistance element 419x (e.g., the product of the resistive value of resistance element 419x and the value of the current through resistance element 419x). Based on equations (3) and (4), the $V_{CE}$ of each one of transistors 417x and 418x may be changed by the variation of the forward voltage of the LEDs of light emitting circuit 410x (e.g., by $V_{F\text{-}206x}$ and $V_{F\text{-}206x'}$), but resistance element 419x, as may be coupled in series with collector C of transistor 418x, may help to mimic the $V_{headroom\text{-}409x}$ factor that may be seen by transistor 417x, which may ultimately reduce the difference between $V_{CE\text{-}417x}$ and $V_{CE\text{-}418x}$. The resistive value of resistance element 419x may be set in such a way that it may generate a $V_{drop\text{-}419x}$ between 0.7 volts and 0.9 volts. For example, the resistive value of resistance element 419x may be between 140 ohms and 180 ohms (e.g., 150 ohms) for an LED current setting of 5 mA for the LEDs of light emitting circuit 410x (e.g., LED 206x and LED 206x'). In some embodiments, LED 206x may be referred to as a master LED of light emitting circuit 410x (e.g., as LED 206x may be coupled to driver channel 409x of circuit 410x and/or to the collector of a master transistor 417x that may act as a reference that may control the output of the current mirror) while LED 206x' and any other additional LEDs of light emitting circuit 410x may each be referred to as a slave LED of light emitting circuit 410x (e.g., each LED other than master LED 206x may be coupled to the master LED of circuit 410x via control sharing circuitry 416x (e.g., via a respective slave transistor), where two or more slave mirrored LEDs may be provided by light emitting circuit 410x). Therefore, a slave LED may be coupled to an associated driver channel and an associated master LED via an associated control sharing circuit (e.g., slave LED 206x' may be coupled to driver channel 409x and master LED 206x via control sharing circuitry 416x).

Any suitable independently controlled LED may be associated in isolation with a particular key 105 of keyboard 104. For example, independently controlled LED 206b of light emitting circuit 410b may be LED 206g as may be individually and solely associated with key 105g of keyboard 104. Additionally or alternatively, any suitable independently controlled LED may be associated along with one or more other LEDs with a particular key 105 of keyboard 104. For example, independently controlled LED 206w of light emitting circuit 410w may be LED 206k as may be associated with key 105k in combination with other LEDs 206l-206n. Alternatively or additionally, any suitable jointly controlled LED may be associated in isolation with a particular key 105 of keyboard 104. For example, jointly controlled LED 206a of light emitting circuit 410a may be LED 206h as may be individually and solely associated with key 105h of keyboard 104, while another jointly controlled LED 206a' of light emitting circuit 410a may be LED 206i as may be individually and solely associated with key 105i of keyboard 104 (e.g., where the backlighting of keys 105h and 105i may be controlled jointly (e.g., by driver channel line 409a)), where such a configuration may enable the ability for circuit 400 to illuminate two or more keys in a particular group of keys with a matched or substantially equivalent brightness by using a master LED and one or more associated slave LEDs of a particular light emitting circuit as controlled by a particular driver channel 409 to illuminate the keys of that key group, which may provide flexibility for organizing and/or defining different groups of keyboard keys with their corresponding LEDs. Such a group of keys may include two or more keys, each of which may be adjacent to (e.g., next to or bordering) at least one other key of the group (e.g., keys 105g, 105h, and 105i). Alternatively, such a group of keys may include a key that is not adjacent to another key in the group (e.g., keys 105g and 105s). Additionally or alternatively, any suitable jointly controlled LED may be associated along with one or more other LEDs with a particular key 105 of keyboard 104. For example, jointly controlled LED 206x of light emitting circuit 410x may be LED 206m as may be associated with key 105k in combination with other LEDs 206l-206n, while another jointly controlled LED 206x' of light emitting circuit 410x may be LED 206n as may be associated with key 105k in combination with other LEDs 206k, 206l, and 206m, one or more of which may be provided by an independently controlled LED or by a jointly controlled LED. In some embodiments, two or more jointly controlled LEDs may be the only LEDs associated with a particular key 105 of keyboard 104 (e.g., any suitable key 105 (e.g., a "shift" key 105s or "caps lock" key 105c or any medium sized key, for example) may be associated with two LEDs that may be provided by jointly controlled LEDs 206x and 206x' of light emitting circuit 410x, and such LEDs may be the only LEDs associated with that key 105). Therefore, by controlling two or more LEDs of a single light emitting circuit with a single driver channel line of a driver, the number of driver channel lines and/or the number of drivers that may be required by computing device 100 to illuminate the keys of keyboard 104 may be reduced, which may optimize electrical design and/or device real estate (e.g., PCB real estate) and/or may enable a thinner mechanical design of the keyboard assembly and/or of device 100 itself.

In some embodiments, two pairs of master-slave LEDs may be combined to provide four LEDs of a particular key. For example, LEDs 206k-206n may be provided by master LED 206a and slave LED 206a' of light emitting circuit 410a and by master LED 206x and slave LED 206x' of light emitting circuit 410x. In one particular embodiment, two master LEDs may be provided at the ends of a string of LEDs of key 105k (i.e., master LED 206a may provide LED 206k and master LED 206x may provide LED 206n), while two slave LEDs may be provided between the ends of the string of LEDs of key 105k (i.e., slave LED 206a' may provide LED 206l and slave LED 206x' may provide LED 206m) and each slave may be adjacent its master. Such a configuration may be useful when brightness uniformity may be more critical with respect to the end portions (e.g., left and right sides or outside area) of the string of LEDs of key 105k than with respect to the inside portion (e.g., middle area or inside area) of the string of LEDs of key 105*k*, for example, as the two master LEDs may be controlled independently to compensate for any possible brightness differences between the ends of the string of LEDs of key 105*k*. In another particular embodiment, two master LEDs may be interspersed amongst two slave LEDs in an alternating fashion in a string of LEDs of key 105*k* (e.g., master LED 206*x* may provide LED 206*k* of key 105*k*, slave LED 206*a'* may provide LED 206*l* of key 105*k*, master LED 206*a* may provide LED 206*m* of key 105*k*, and slave LED 206*x'* may provide LED 206*n* of key 105*k*), such that a first master-slave pair of LEDs 206*a*-206*a'* may be provided between the ends of the string of LEDs of key 105*k*, and such that a second master-slave pair of LEDs 206*x*-206*x'* may be provided at the ends of the string of LEDs of key 105*k*, where the two masters may be separated by a slave and where the two slaves may be separated by a master (or where the two masters may be adjacent and the two slaves may be adjacent (e.g., master LED 206*x* may provide LED 206*k* of key 105*k*, master LED 206*a* may provide LED 206*l* of key 105*k*, slave LED 206*a'* may provide LED 206*m* of key 105*k*, and slave LED 206*x'* may provide LED 206*n* of key 105*k*)). Such a configuration may be useful when brightness uniformity may be more critical across the entirety of the string of LEDs of key 105*k*, for example, as the two master LEDs may be controlled independently to compensate for any possible brightness differences between the inside and outside areas of the string of LEDs of key 105*k*, such that the first master-slave pair of LEDs 206*a*-206*a'* can be set to adjust the brightness of the inside portion (e.g., middle area or inside area) of the string of LEDs of key 105*k* and such that the second master-slave pair of LEDs 206*x*-206*x'* can be set to adjust the brightness of the end portions (e.g., left and right sides or outside area) of the string of LEDs of key 105*k*. This might not be achieved if each master is positioned at a respective end of the string of LEDs of key 105*k*. While key 105*k* may be referred to herein as a space bar key, key 105*k* may be any suitable key of any suitable keyboard. However, when a master-slave LED combination may be provided under a single key, any non-uniformity, however miniscule, between the brightness of light from the master and from the slave may be less obvious if the master-slave combination is used with a key that does not have any character(s) or glyph(s) associated therewith through which light may shine. However, when brightness uniformity may not be as crucial, master-slave combinations may be split between any two distinct keys, which may further reduce the number of driver channels required. In any embodiments, different mechanical and/or optical mechanisms (e.g., light filters, physical diffusers, light guides, and/or the like) may be used to adjust the light as emitted from an LED before it is perceived by an end user through a key or adjacent a key edge (e.g., to partially hide or obfuscate any brightness uniformity discrepancy). Therefore, rather than providing a dedicated independently controllable driver channel line for each LED of circuit 400, when circuit 400 includes at least one light emitting circuit 410*a* with at least one control sharing circuitry 416*a* for enabling a master LED and one or more associated slave LEDs to be controlled by a single driver channel line 409*a* for emitting the same or substantially similar intensity of light, the number of driver channel lines of circuit 400 may be reduced while still providing a particular number of LEDs, which may improve efficiency of electrical design and real estate of circuit 400 within device 100, thereby enabling a thinner mechanical design of device 100 (e.g., a thinner design of keyboard 104). Therefore, control sharing circuitry 416*a* of light emitting circuit 410*a* may be operative to maintain uniformity between the output of each LED of light emitting circuit 410*a* (e.g., to ensure that the brightness of light La is the same or substantially the same as the brightness of light La').

FIG. 5 is a flowchart of an illustrative process 500 for illuminating a keyboard of a keyboard assembly that includes a plurality of keys, a first light emitting element, a second light emitting element, a light driver that drives a control signal on a driver channel, and a current mirror circuit (keyboard 104 with keys 105, LED 206*a*, LED 206*a'*, driver 402*a* driving control signal 408*a* on driver channel 409*a*, and control sharing circuitry 416*a*). At step 502 of process 500, the control signal may simultaneously control an output of the first light emitting element that illuminates only one key of the plurality of keys and an output of the second light emitting element that illuminates only one key of the plurality of keys (e.g., control signal 408*a* may simultaneously control light La of LED 206*a* that may illuminate only one key 105 and light La' of LED 206*a'* that may illuminate only one key 105). At step 504 of process 500, the current mirror circuit may maintain uniformity between the output of the first light emitting element and the output of the second light emitting element (e.g., control sharing circuitry 416*a* may be operative to maintain the brightness of light La' substantially equal to the brightness of light La).

It is understood that the steps shown in process 500 of FIG. 5 are only illustrative and that existing steps may be modified or omitted, additional steps may be added, and the order of certain steps may be altered.

The various aspects, embodiments, implementations or features of the described embodiments can be used separately or in any combination. Moreover, one, some, or all of the processes and/or various other aspects described herein may each be implemented by software, but may also be implemented in hardware, firmware, or any combination of software, hardware, and firmware. Instructions for performing these processes may also be embodied as machine- or computer-readable code recorded on a machine- or computer-readable medium. In some embodiments, the computer-readable medium may be a non-transitory computer-readable medium. Examples of such a non-transitory computer-readable medium include but are not limited to a read-only memory (ROM), a random-access memory (RAM), a flash memory, a CD-ROM, a DVD, a magnetic tape, a removable memory card, and a data storage device (e.g., any suitable memory component of computing device 100). In other embodiments, the computer-readable medium may be a transitory computer-readable medium. In such embodiments, the transitory computer-readable medium can be distributed over network-coupled computer systems so that the computer-readable code is stored and executed in a distributed fashion. For example, such a transitory computer-readable medium may be communicated from one electronic device to another electronic device using any suitable communications protocol (e.g., the computer-readable medium may be communicated to computing device 100 from any remote subsystem). Such a transitory computer-readable medium may embody computer-readable code, instructions, data structures, program modules, or other data in a modulated data signal, such as a carrier wave or other transport mechanism, and may include any information delivery media. A modulated data signal may be a signal that has one or more of its characteristics set or changed in such a manner as to encode information in the signal.

While there have been described systems and methods for selective keyboard backlighting with reduced driver circuitry, it is to be understood that many changes may be made therein without departing from the spirit and scope of the subject matter described herein in any way. The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A keyboard assembly comprising:
a plurality of keys;
a plurality of light emitting elements comprising at least a first light emitting element and a second light emitting element;
a light driver that drives a control signal on a driver channel; and
a control sharing circuit that enables the control signal from the driver channel to simultaneously control an output of the first light emitting element and an output of the second light emitting element, wherein:
the second light emitting element is coupled to the driver channel via the first light emitting element;
the first light emitting element is positioned with respect to the plurality of keys such that the output of the first light emitting element illuminates only one key of the plurality of keys; and
the second light emitting element is positioned with respect to the plurality of keys such that the output of the second light emitting element illuminates only one key of the plurality of keys.

2. The keyboard assembly of claim 1, wherein:
the output of the first light emitting element illuminates only a first key of the plurality of keys;
the output of the second light emitting element illuminates only a second key of the plurality of keys; and
the first key is different than the second key.

3. The keyboard assembly of claim 2, wherein the first key is adjacent to the second key.

4. The keyboard assembly of claim 2, wherein the first key is not adjacent to the second key.

5. The keyboard assembly of claim 1, wherein:
the output of the first light emitting element illuminates only a first key of the plurality of keys; and
the output of the second light emitting element illuminates only the first key of the plurality of keys.

6. The keyboard assembly of claim 5, wherein:
the light driver further drives another control signal on another driver channel;
the plurality of light emitting elements further comprises a third light emitting element that receives the other control signal from the other driver channel for controlling an output of the third light emitting element; and
the output of the third light emitting element illuminates only one key of the plurality of keys.

7. The keyboard assembly of claim 6, wherein the output of the third light emitting element illuminates only the first key of the plurality of keys.

8. The keyboard assembly of claim 6, wherein:
the output of the third light emitting element illuminates only a second key of the plurality of keys; and
the first key is different than the second key.

9. The keyboard assembly of claim 1, wherein:
the light driver further drives another control signal on another driver channel;
the plurality of light emitting elements further comprises a third light emitting element and a fourth light emitting element;
the keyboard assembly further comprises another control sharing circuit that enables the other control signal from the other driver channel to simultaneously control an output of the third light emitting element and an output of the fourth light emitting element, wherein:
the third light emitting element is positioned with respect to the plurality of keys such that the output of the third light emitting element illuminates only one key of the plurality of keys; and
the fourth light emitting element is positioned with respect to the plurality of keys such that the output of the fourth light emitting element illuminates only one key of the plurality of keys.

10. The keyboard assembly of claim 9, wherein:
the output of the first light emitting element illuminates only a first key of the plurality of keys;
the output of the second light emitting element illuminates only a second key of the plurality of keys;
the output of the third light emitting element illuminates only a third key of the plurality of keys;
the first key is different than the second key; and
the first key is different than the third key.

11. The keyboard assembly of claim 9, wherein:
the output of the first light emitting element illuminates only a first key of the plurality of keys;
the output of the second light emitting element illuminates only the first key of the plurality of keys;
the output of the third light emitting element illuminates only a second key of the plurality of keys;
the output of the fourth light emitting element illuminates only the second key of the plurality of keys; and
the first key is different than the second key.

12. The keyboard assembly of claim 9, wherein:
the output of the first light emitting element illuminates only a first key of the plurality of keys;
the output of the second light emitting element illuminates only the first key of the plurality of keys;
the output of the third light emitting element illuminates only the first key of the plurality of keys; and
the output of the fourth light emitting element illuminates only the first key of the plurality of keys.

13. The keyboard assembly of claim 9, wherein:
the control sharing circuit comprises a first current mirror circuit;
the other control sharing circuit comprises a second current mirror circuit;
the second light emitting element is coupled to the driver channel and the first light emitting element via the first current mirror circuit; and
the fourth light emitting element is coupled to the other driver channel and the third light emitting element via the second current mirror circuit.

14. The keyboard assembly of claim 13, wherein:
the output of the first light emitting element illuminates only a first key of the plurality of keys;
the output of the second light emitting element illuminates only the first key of the plurality of keys;

the output of the third light emitting element illuminates only the first key of the plurality of keys;

the output of the fourth light emitting element illuminates only the first key of the plurality of keys; and the first, second, third, and fourth light emitting elements are arranged in a linear segment comprising:

the first light emitting element at a first end of the linear segment;

the third light emitting element at a second end of the linear segment;

the second light emitting element in between the first light emitting element and the third light emitting element; and the fourth light emitting element in between the second light emitting element and the third light emitting element.

15. The keyboard assembly of claim 14, wherein the first key is a space bar key having a length.

16. The keyboard assembly of claim 15, wherein the linear segment is positioned along the length of the space bar key.

17. The keyboard assembly of claim 13, wherein:

the output of the first light emitting element illuminates only a first key of the plurality of keys;

the output of the second light emitting element illuminates only the first key of the plurality of keys;

the output of the third light emitting element illuminates only the first key of the plurality of keys;

the output of the fourth light emitting element illuminates only the first key of the plurality of keys; and the first, second, third, and fourth light emitting elements are arranged in a linear segment comprising:

the third light emitting element at a first end of the linear segment;

the fourth light emitting element at a second end of the linear segment;

the second light emitting element in between the third light emitting element and the fourth light emitting element; and the first light emitting element in between the second light emitting element and the fourth light emitting element.

18. The keyboard assembly of claim 1, wherein the control sharing circuit maintains uniformity between the output of the first light emitting element and the output of the second light emitting element.

19. A keyboard assembly comprising:

a plurality of keys;

a first light emitting element;

a second light emitting element;

a light driver that drives a control signal on a driver channel; and a current mirror circuit, wherein:

the second light emitting element is coupled to the first light emitting element only via the current mirror circuit;

the second light emitting element is coupled to the driver channel via the first light emitting element; and the control signal from the driver channel simultaneously controls:

an output of the first light emitting element that illuminates only one key of the plurality of keys; and an output of the second light emitting element that illuminates only one key of the plurality of keys.

20. A method for illuminating a keyboard of a keyboard assembly that comprises a plurality of keys, a first light emitting element, a second light emitting element, a light driver, a driver channel, and a current mirror circuit, the method comprising:

driving, with the light driver, a control signal on the driver channel;

simultaneously controlling, with the control signal on the driver channel, both an output of the first light emitting element that illuminates only one key of the plurality of keys and also an output of the second light emitting element that illuminates only one key of the plurality of keys; and maintaining, with the current mirror circuit, uniformity between the output of the first light emitting element and the output of the second light emitting element.

* * * * *